Feb. 2, 1926. 1,571,516

F. G. FOLBERTH ET AL

WINDSHIELD CLEANER

Filed March 4, 1922 2 Sheets-Sheet 1

Feb. 2, 1926. 1,571,516
F. G. FOLBERTH ET AL
WINDSHIELD CLEANER
Filed March 4, 1922 2 Sheets-Sheet 2

Inventors
Fred G. Folberth
William M. Folberth
By
Attorney

Patented Feb. 2, 1926.

1,571,516

UNITED STATES PATENT OFFICE.

FRED G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed March 4, 1922. Serial No. 541,209.

*To all whom it may concern:*

Be it known that we, FRED G. FOLBERTH and WILLIAM M. FOLBERTH, citizens of the United States, residing at Cleveland, in the county of Cuyahoga and State of Ohio, have invented certain new and useful Improvements in Windshield Cleaners, of which the following is a specification.

This invention relates to windshield cleaners, and more particularly to power operated cleaner elements.

It has heretofore been proposed to employ a cleaner element swinging in an arc of a circle and contacting with the glass of a windshield, the cleaner element being connected to an oscillating shaft of a cleaner motor arranged on the windshield and operated by differential pressure.

In the present invention, we provide a cleaner element which is maintained in a vertical position at all times, the upper and lower ends of the cleaner element swinging in arcs and parallel to each other.

By means of this construction, a broader sweep is obtained at the top of the cleaner element and a larger portion of the windshield is thus cleaned.

The provision of a cleaner element maintained in a vertical position further reduces vibration as the cleaner element is supported by an auxiliary cleaner arm in addition to the cleaner arm heretofore employed, and the parts are thus more rigidly held in position.

Figure 1:
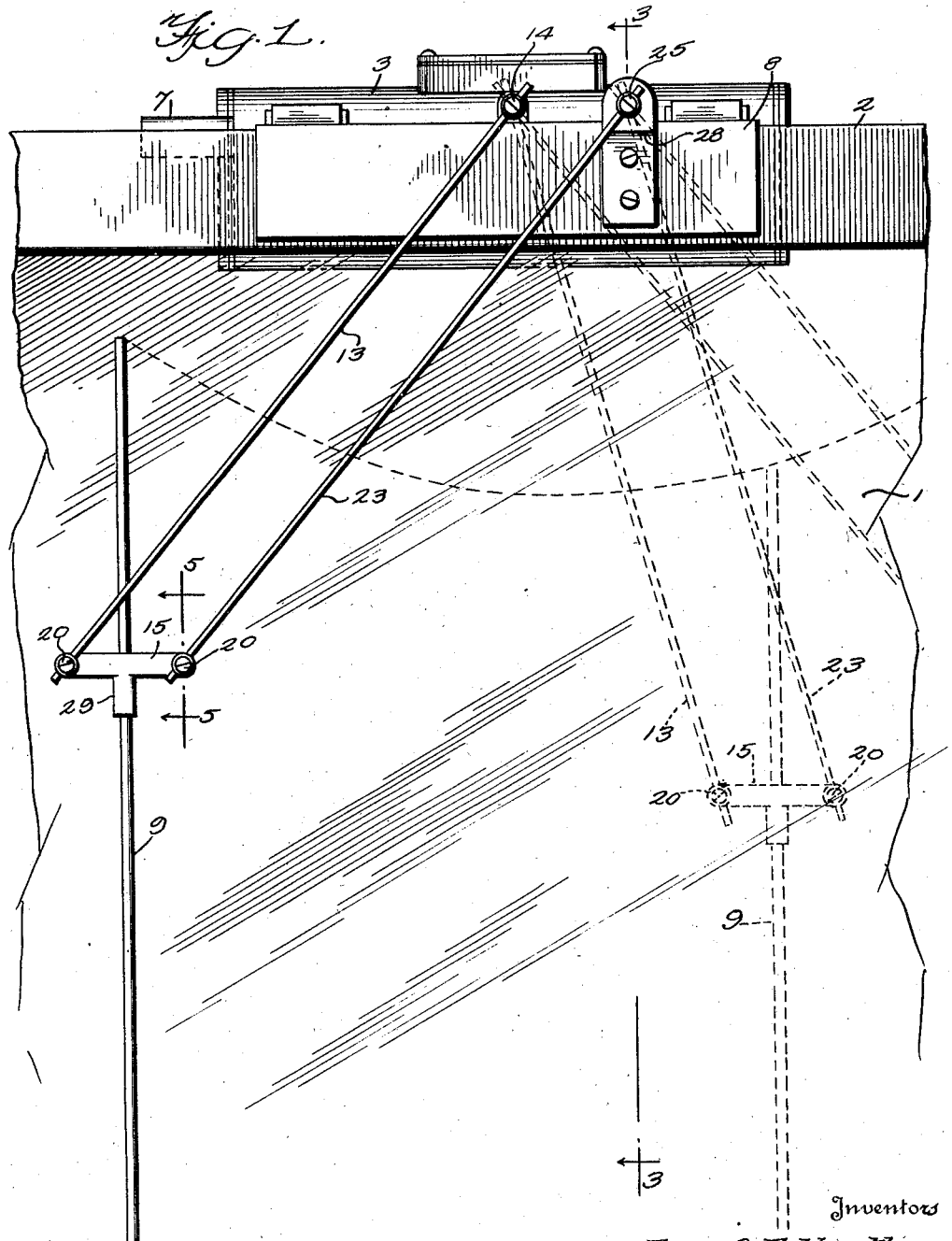
Figure 2:
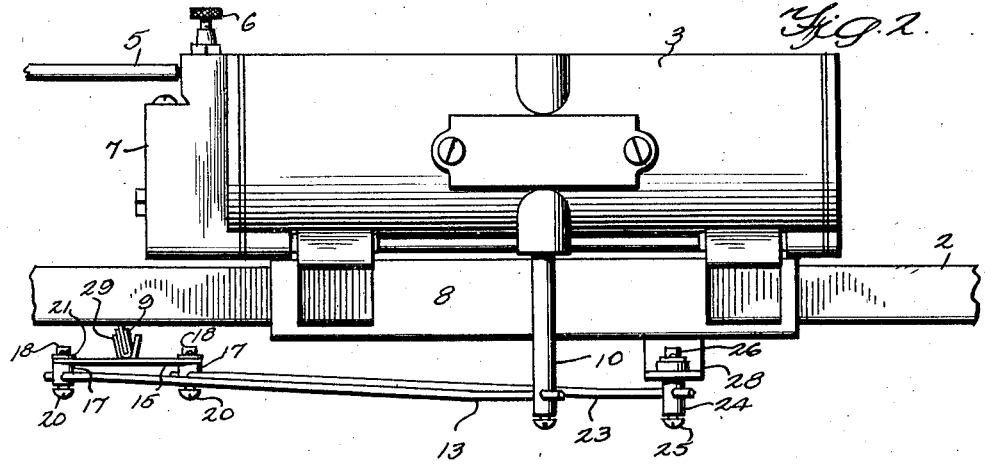
Figure 4:
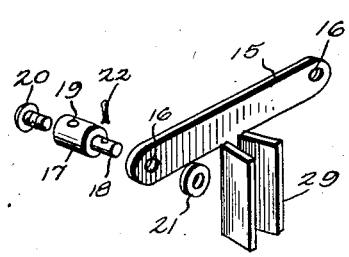
Figure 3:
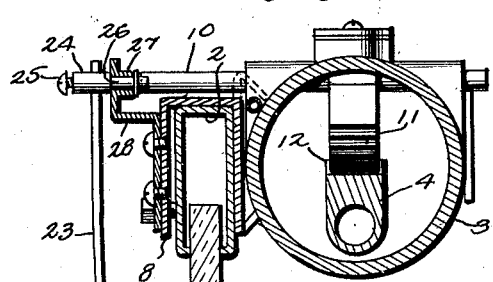
Figure 5:
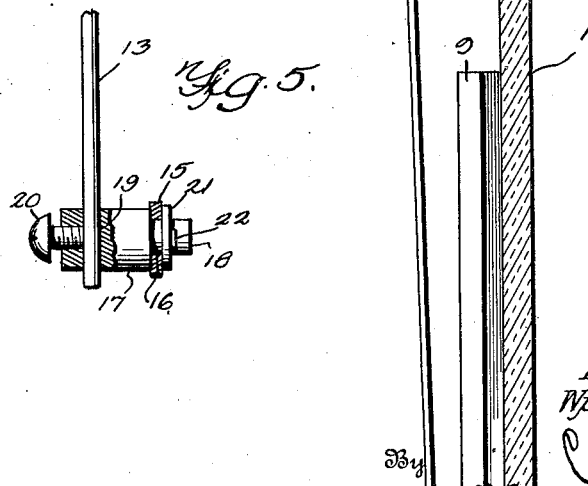

In the accompanying drawings, we have shown one embodiment of the invention. In this showing:

Figure 1 is a front elevation of a portion of the windshield of a vehicle, showing the invention applied, Figure 2 is a plan view, Figure 3 is a substantially central vertical transverse sectional view, Figure 4 is a detail view of the cleaner support, and, Figure 5 is a detail sectional view on line 5—5 of Figure 1.

Referring to the drawings, the reference numeral 1 designates an ordinary windshield, such as is employed on automobiles and other vehicles. This windshield is arranged in the usual windshield frame 2. The windshield cleaner comprises a motor casing 3, having a suitable actuating member 4 arranged therein. The motor is connected to a source of differential pressure by a conduit 5, which is controlled by a valve 6. Suitable valve mechanism (not shown) is arranged in the head 7 of the motor casing to alternately place the opposite ends of the cylinder in communication with the conduit 5 and thus automatically operate the motor. The motor casing is secured to the windshield frame in any suitable manner, as by a bracket 8. As shown, the motor casing is arranged on one side of the windshield, and a cleaner element 9 is arranged on the opposite side. This construction permits the motor casing to be mounted on the interior of the vehicle, and thus protect it from the elements. A drive shaft 10 extends transversely of the motor, substantially centrally thereof, and is provided with a segmental gear 11, meshing with a rack 12 on the actuating member to oscillate the drive shaft when the actuating member reciprocates in the casing. The drive shaft extends to the outside of the windshield frame and is provided with an opening for the reception of a cleaner rod 13. This cleaner rod is retained in position by a set screw 14, arranged in the end of the drive shaft and engaging the cleaner rod. The cleaner rod is connected to a substantially T-shaped cleaner support 15. As shown, the upper arm of this support is provided with openings 16 at its opposite ends. A pin 17 is adapted to be arranged in one of these openings, the pin being provided with a reduced end 18, having a diameter substantially equal to the diameter of the opening 16. The enlarged portion of the pin is provided with a transverse opening 19 for the reception of the cleaner rod 13 which is retained in position by means of a set screw 20. The arm 15 is received against the shoulder formed by the junction of the enlarged and reduced portions of the pin 17 and a washer 21 may be arranged on the opposite side of the arm. A cotter pin 22 may be employed to retain the washer in position. The opposite end of the arm 15 is similarly connected to an auxiliary cleaner rod 23. The upper end of this rod is connected to a pin 24 being retained in position by a set screw 25. This pin is provided with a reduced portion 26, which is received in a bearing 27 carried by an auxiliary bracket 28, suitably secured to the bracket 8. By means of the construction described, the cleaner support 15 is retained in a horizontal plane throughout its movement, the connection of the cleaner rod 13 and the auxiliary rod 23 to the opposite ends thereof causing it to remain in a horizontal position. The cleaner support is further provided with a depending perpendicular portion 29, which is substantially V-shaped in cross section and is adapted to receive and support the cleaner element. A cleaner element may be secured in the support in any suitable manner to prevent relative longitudinal movement.

In Figure 1 of the drawings, the movement of the cleaner element is illustrated. When the shaft 10 swings or oscillates, the power is transmitted through the arm 15 to the auxiliary cleaner arm 23, which swings the pin 24 in the bearing 27, and causes it to oscillate. The arms 13 and 23, moving together, cause the support 15 to remain in a substantially horizontal position and the V-shaped portion 29 of the support maintains a substantially vertical position. This retains the cleaner element 9 substantially vertical at all times.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. A windshield cleaner comprising a pair of pivotally mounted rods adapted to oscillate in parallelism, a cleaner support comprising a transverse arm pivotally connected to the lower ends of said rods at its opposite ends whereby said transverse arm will be retained in a substantially horizontal position, depending webs formed on said transverse arm forming a holder substantially V-shaped in cross section, and a cleaner element arranged in said holder.

2. A windshield cleaner comprising a motor, a cleaner shaft adapted to be oscillated by said motor, a cleaner rod carried by said shaft, an auxiliary cleaner rod pivotally mounted adjacent said shaft and arranged parallel to said cleaner rod, a cleaner support comprising a transverse arm having its ends pivotally connected to the free ends of said cleaner rod and said auxiliary rod respectively whereby said transverse arm will be retained in a horizontal position, depending webs formed on said arm forming a holder substantially V-shaped in cross section, and a cleaner element carried by said holder.

3. A windshield cleaner comprising a motor adapted to be arranged on a windshield frame, a cleaner shaft adapted to be oscillated by said motor, a cleaner rod carried by said shaft, a bracket mounted on said windshield frame, an auxiliary cleaner rod pivotally mounted on said bracket and arranged parallel to said cleaner rod, a cleaner support comprising a transverse arm having its ends pivotally connected to said cleaner rod and said auxiliary cleaner rod respectively whereby said transverse arm will be retained in a horizontal position, depending webs formed on said transverse arm forming a holder V-shaped in cross section, and a cleaner element mounted in said holder.

In testimony whereof, we affix our signatures.

FRED G. FOLBERTH.
WILLIAM M. FOLBERTH.